July 3, 1951     L. L. BARNETT     2,559,183
TRANSPLANTER DRILL SET

Filed Dec. 10, 1946     3 Sheets-Sheet 1

Inventor
Lawton L. Barnett

By Clarence A. O'Brien
and Harvey B. Jacobson
Attorneys

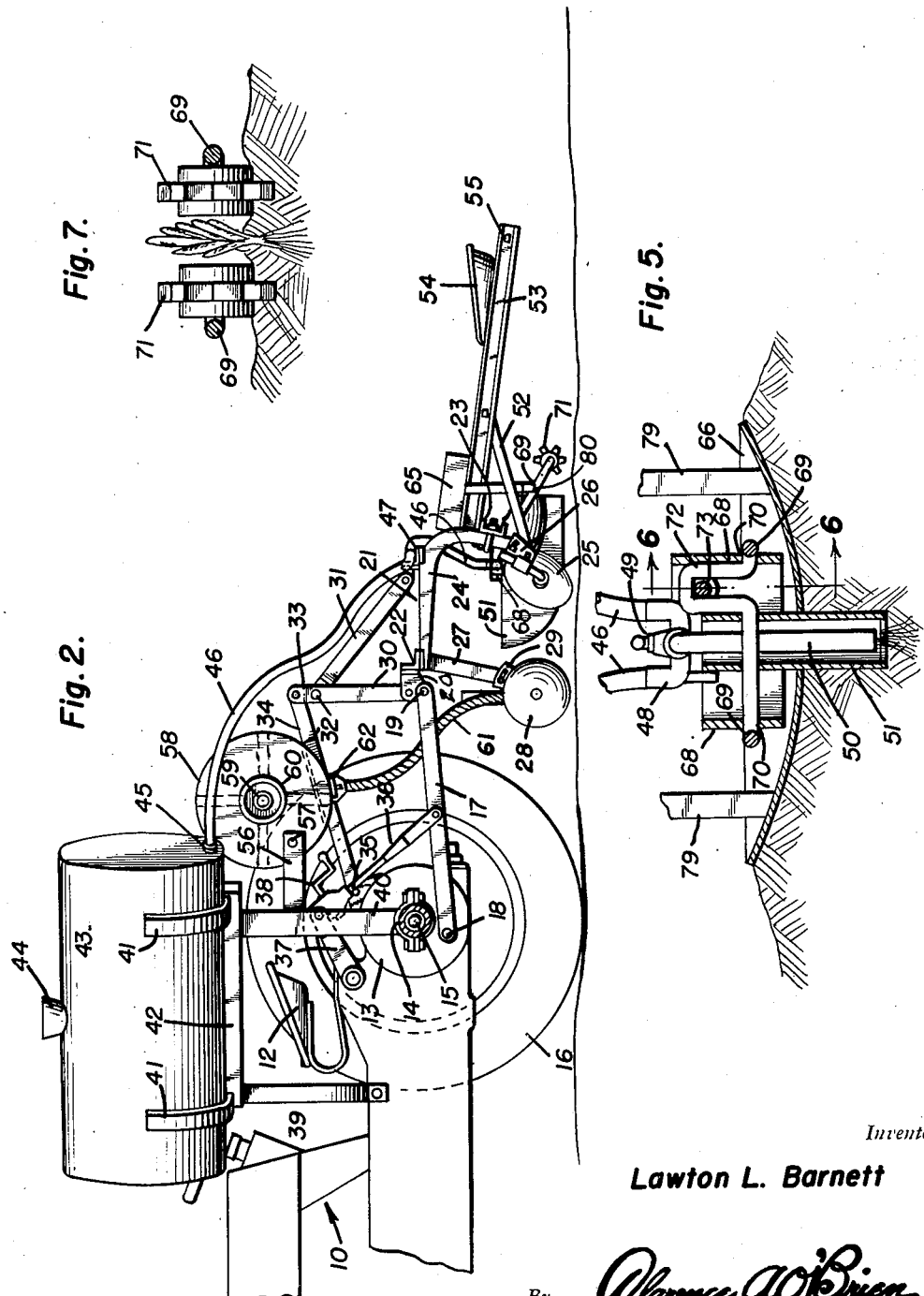
Inventor
Lawton L. Barnett

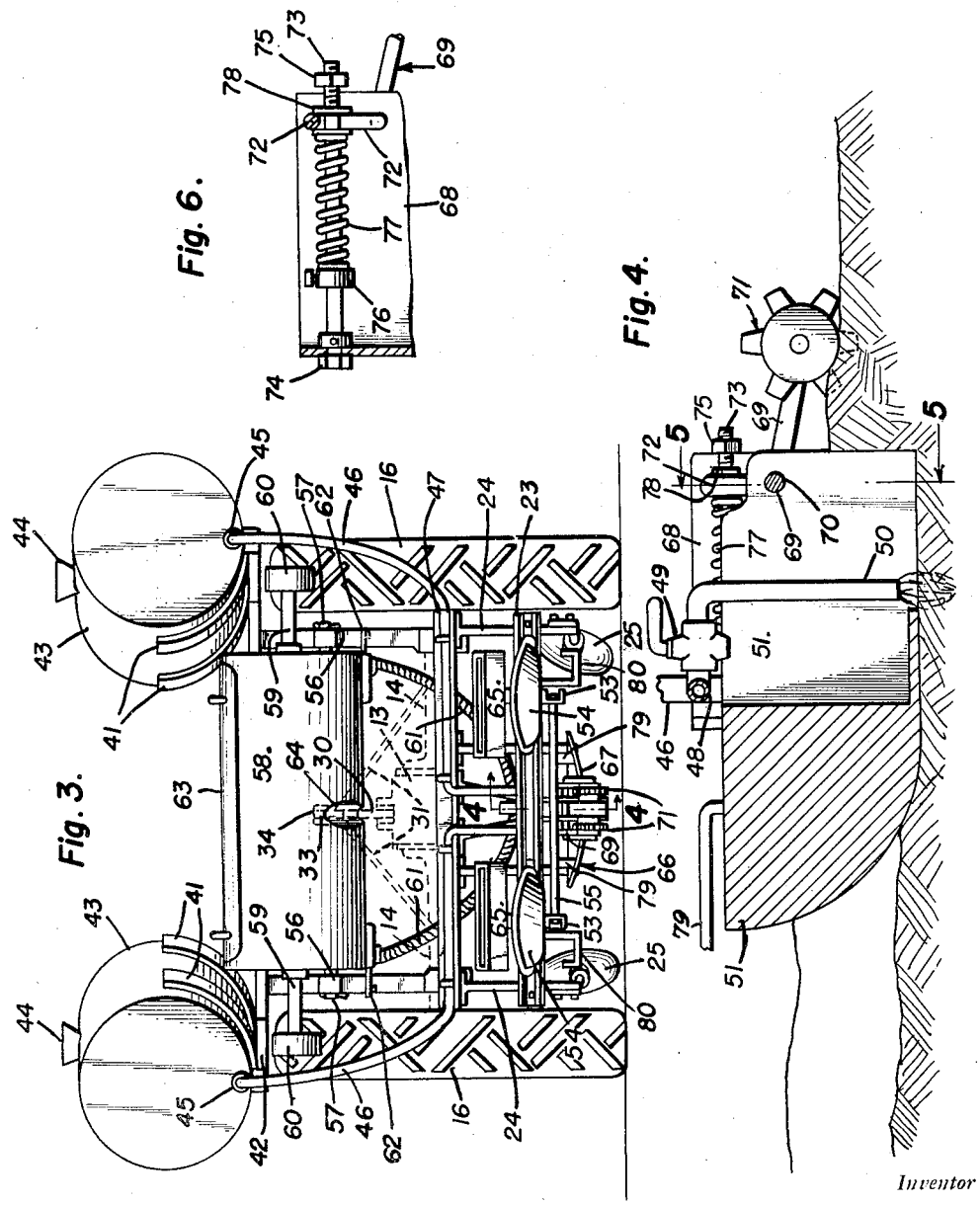

Patented July 3, 1951

2,559,183

UNITED STATES PATENT OFFICE 2,559,183

TRANSPLANTER DRILL SET

Lawton L. Barnett, O'Brien, Fla.

Application December 10, 1946, Serial No. 715,154

2 Claims. (Cl. 111—85)

This invention relates to new and useful improvements in transplanter drill sets, adapted to be mounted on a tractor for use in transplanting young growing plants.

The primary object of this invention is to provide a drill set which may be quickly and adjustably mounted on a tractor, and which drill set will, during advance thereof, open a furrow in the soil for the reception of plants and water or fertilizer and then close the furrow to properly cover the roots of a transplanted plant.

Another important object of the invention is to provide a machine of this character that may be mounted on a tractor as a unit, and in which the furrow closing means of the same is movable vertically with respect to the furrow opening means, and in which such opening and closing means are connected together in such a manner that the furrow closing means is biased downwardly, and in which the possibility of soil or other foreign matter interfering with the operation of the same is minimized.

Other objects and advantages reside in the details of construction and operation as more fully hereinafter described and claimed, reference being had to the accompanying drawings forming part hereof, wherein like numerals refer to like parts throughout, and in which:

Figure 2 is a side elevation of the device as shown in Figure 1.

Figure 3 is a rear elevation of the machine.

Figure 4 is an enlarged fragmentary detail longitudinal sectional view taken upon the section line 4—4 of Figure 3, showing the trench or furrow opening blade and fertilizer and water supply means, as well as the hiller or furrow closing wheels, for pressing and moving the soil against and around the roots and embedded parts of the plants when set.

Figure 5 is a vertical sectional view taken on the line 5—5 of Figure 4.

Figure 6 is a fragmentary detail view taken on the section line 6—6 of Figure 5, and Figure 7 is a vertical sectional elevation showing the toothed wheels for packing and pressing the soil around and against the plants on opposite sides thereof.

Figure 1:
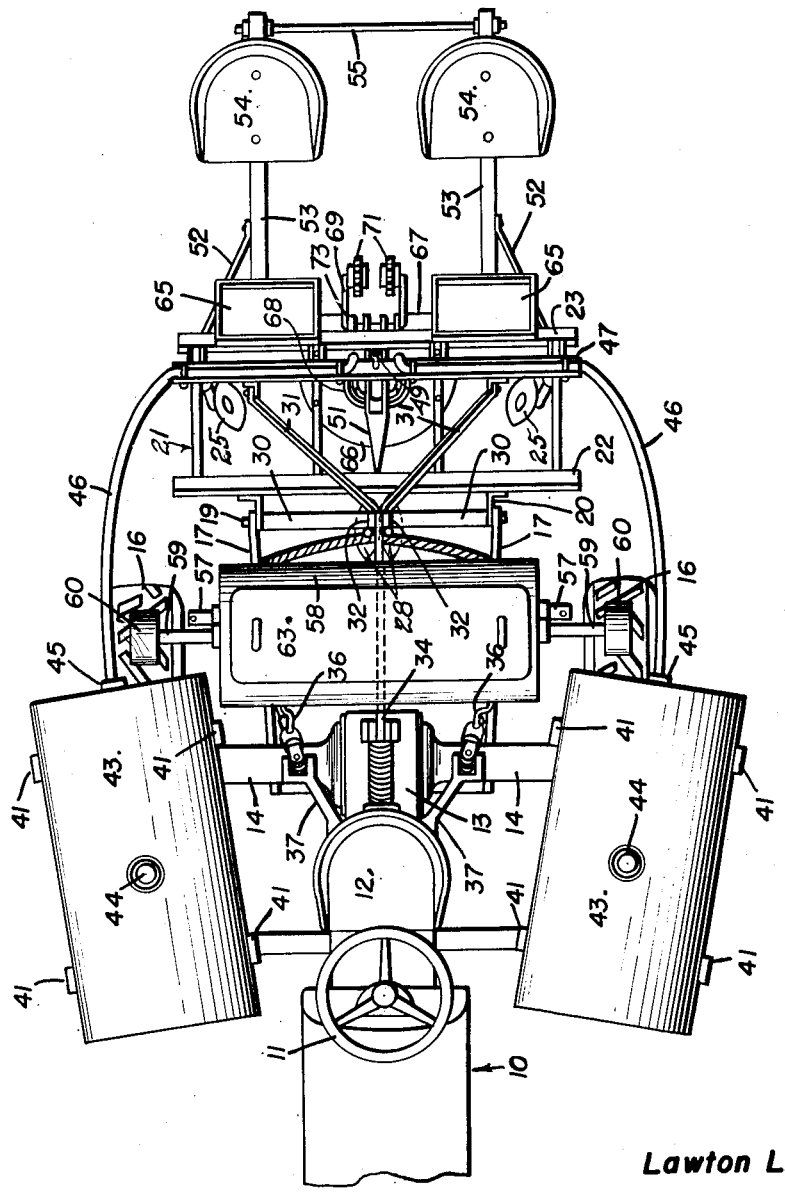
Figure 1 is a top plan view of a tractor mounted transplanter and fertilizer distributor constructed in accordance with the invention and associated with a tractor and the power lift thereof.

Referring to the drawings in detail in which like reference characters designate corresponding parts throughout the several views, there is shown a tractor 10 of the farm or agricultural type having the usual front steering wheels capable of being turned by the steering wheel 11 by the operator reposed on a seat 12 mounted on the frame or chassis of the machine, and including the rear axle drive housing 13 for the differential having axle housings or extensions 14, the drive axles 15 within which bear the usual large rear drive wheels 16, preferably of the rubber tired type having traction lugs on the treads thereof. The tractor has the usual power lift driven from the power take-off of the tractor or otherwise, and including arms 17, pivoted at 18 to the differential housing 13 and connected by a transverse pivot member 19 with links 20 supporting a cultivator frame 21 including transverse bars 22 and 23 in spaced parallel relation to which are connected the angular shanks 24 on the rear ends of which are supported rearwardly and inwardly spacing cultivator disks or listers 25 mounted for angular and vertical adjustment in brackets 26. Arms 27 are also disposed forwardly and inwardly of the depending arms of the shanks 24, to support cultivator disks 28 also vertically and angularly adjustable by means of brackets 29 and designed to open the furrow and prepare the soil for planting, while the disks 25 act as covering means, to level the soil and throw the same inwardly. Upwardly converging braces 30 are pivotally connected to the arms 17 at 19, and have rearwardly branching links 31 pivotally connect thereto near their upper ends as at 32 and are in turn connected by links 33 to a power lift connection 34 pivoted to the housing 13 as at 35 and adapted to be raised and lowered by suitable control means as common in the art, and indicated as links 36 and 37 with an operating member 38 so as to elevate or lower the cultivator 21.

Supported on the frame of the tractor and axle housings 14, is a frame including front and rear uprights 39 and 40 having arcuate racks 41 at their upper ends supported on longitudinal connecting members 42 to support forwardly divergent tanks 43 for water. These tanks are provided with filling openings or funnels 44 and outlets 45 at their rear ends, from which discharge hose 46 extend rearwardly and inwardly in opposite directions toward each other across a channel bar 47 transversely connecting the shanks 24. The hoses are connected centrally by a T-fitting 48 having a control valve or faucet 49, from which a flexible hose 50 of short length, depends, for discharging water under pressure into the trench or furrow opened by a blade or shoe 51 having side portions spaced apart and tapering toward the front, as clearly shown in Figure 1 of the drawings, suitably supported by the bar 23 and forwardly inclined braces 52 which also take rearwardly extending transversely spaced parallel seat supporting bars 53 upon which seats 54 are supported for use by the occupants setting the plants or in picking or harvesting the same or crops from the growing plants. These seats may be capable of adjustment to relieve the operators reposed on the seats supported by the seat supports or frames to which the seats are bolted. The bars 53 are connected at their rear ends by an adjustable transverse connecting brace or rod 55.

In addition to the tanks 43 for water supported upon the racks 41 and frame structure supporting the latter upon the tractor at opposite sides of the seat, uprights or braces 40 are provided with rearwardly extending arms 56 to support a pivot shaft 57 upon which a fertilizer hopper or cylinder 58 is pivotally mounted to rest upon the link 34 so as to be capable of being raised and lowered from the finger touch control of the power lift of the tractor. In addition to the pivot shaft 57, a shaft 59 extends axially through the fertilizer hopper or tank drum 58 and upon the ends thereof, pulleys or wheels 60 are fixed to engage the lugs on the treads of the drive wheels 16, so as to be turned and agitate the liquid fertilizer contained within the drum 58, which may be supplemented by liquid plant food contained therein or in the tanks 43 mixed with the water therein. Due to the agitation of the drum 58 in the rolling of the pulleys or wheels 60 on the lugs of the drive wheels 16 or pneumatic tires thereof, feeding of the fertilizer in proper quantity, is insured. This is effected through the medium of flexible discharge chutes or hose 61 leading from the drum 58 near its ends at the bottom, with lever operated valves 62 for controlling the discharge of the fertilizer from the drum. Like the tanks 43, the drum or hopper 58 may be in the form of a barrel and provided with an opening in the top closed by a cover 63 which upon being removed will permit replenishing of the supply of liquid fertilizer in the drum. It may also be mentioned that both tanks 43 may be filled at the same time as the water mixed with plant food if desired, runs through the hose from one tank to the other, to speed up filling. By raising and lowering the hopper or drum 58 by the power lift of the tractor, the wheels or pulleys 60 may be engaged or disengaged from the tractor lugs of the drive wheels 16 and when engaged therewith, will cause agitation or shaking of the hopper or drum to insure feed of the fertilizer. By raising the cultivator and setting operators for transplanting young growing plants of tobacco, tomatoes or other vegetables, with the power lift of the tractor, the agitator or shaker of the fertilizer hopper or drum is taken out of gear, as compared with being in gear when the pulleys or wheels 60 are lowered to engage the tractor tire lugs of the drive wheels of the tractor, and the hopper or drum 58 may have a central depression 64 at the back and bottom, accommodating the connecting link 34 of the power lift of the tractor to centrally support the hopper or drum 58 in a raised position, when the supply may be cut off at the levers or valves 62. In this way, the discharge of the fertilizer may be regulated by the operator from the driver's seat, so that more fertilizer may be discharged in poor soil and less in better soil. The fertilizer chutes or hose 61 lead to the hillers formed by the disks 28 at the right and left hand sides of the row where the trench or furrow is opened by the blade or shoe 51, so as to supply fertilizer at the proper places without contacting with the roots and lower portions of the plants. The disks 25 and 28 are all supported from the cultivator arms or shanks 24 of the cultivator which trails in rear of the tractor connected thereto by the power lift device as described.

Boxes 65 are arranged upon the bars or seat supports 53 in front of the seats, to support the young plants to be transplanted or set and any suitable box, receptacle or canvas sheet may be draped on the top of the cultivator frame to support additional plants, or to receive the crops when the same are picked or harvested. The disks or listers 25, serve to throw the soil inwardly and to level the same, in connection with a concave leveling pan 66 suspended from beneath the cultivator arms, this pan being concave on top and convex on the bottom and being of circular contour, except at the back, where it is provided with a straight edge 67 and an opening at the bottom to receive the bifurcated blade 51 with the tapered front end forming a furrow opener or trench shoe. In addition, plates 68 are spaced on opposite sides of the blade 51 above the pan 66 and have their forward ends curved inwardly and suitably secured to the opposite sides of the blade 51 to constitute a substantially U-shaped bracket that opens rearwardly with the blade 51 extending forwardly through the bight portion of the same. The plates 68 are for the purpose of pivotally mounting a substantially U-shaped bail member 69 in opposed openings or bearings 70 therein, with toothed or cog wheels 71 rotatably suported at the rear ends of the legs thereof, to press the soil and pack the same at the sides and around the lower portions of the plants after the latter are set in the holes formed by the water discharging from the hose 50 by opening the valve or faucet 46 under control of the operators upon the seats 54 who set the plants in transplanting and pick or harvest the crops. Obviously, the soil being prepared as the machine is advanced, permits the entire operation to be carried on at the same time, and the holes for the plants are formed in the trench or furrow cut by the blade 51 which opens the soil as the machine travels. In order to obtain proper pressure upon the toothed or cog wheels 71 for covering the plants and packing the soil around the same, the bight portion of the U-shaped hanger or arm 69 is provided with a crank portion 72 between the blade or shoe 51 at one side and the adjacent portion of the plate 68 which is made higher at this point as shown in Figure 5 of the drawings to receive a bolt 73 disposed horizontally and having its forward end adjustably connected as at 74, to the U-shaped member and a nut 75 adjustable on the rear end thereof at its threaded portion. A collar 76 is fixed to the bolt or rod 73 and a compression spring 77 is disposed on the bolt between the collar 76 and a grooved collar 78 on the bolt in which the crank 72 is engaged, so that adjustment of the tension of the spring 77 may be effected. In this way, the spring 77 exerts pressure rearwardly on the crank 72, to press the toothed or cog wheels 71 into the soil to pack the same around and particularly at the sides of the plants when set. The leveler 66 is supported by shanks 79, and footrests 80 are provided on each side, depending from the bars 53, to support the feet of the setters or pickers.

In the operation of the machine as described, it will be seen that as the machine is drawn or advanced across a field, the ground will be prepared by the cultivator implements when the parts are lowered from the finger tip control of the power lift of the tractor and may be raised to permit convenient turning. Also, short turns may be made and expedited as compared with a drawn device, as distinguished from the device described connected to the power lift of the tractor. The soil in the field is opened to receive the fertilizer, and a bed listed and leveled, besides being opened with a trench or furrow to receive the plants, especially in the holes formed by the water. The soil or dirt is then dragged behind the plant and packed by the toothed or cog wheels, so that the entire operation is simultaneous and continuous without stopping, except to obtain a supply of water, fertilizer or plants, the water being supplied with plant food which is dissolved therein if desired. Obviously, the device may be raised by the power lift of the tractor when turning and when not in use, for transportation to and from the field. Also, by removing the water and fertilizer containers which are bolted on to the tractor frame and axle housing, the device may be used for priming the soil around the plants, cultivating and in picking or harvesting the crops, by the persons reposed upon the seats 54. In this way, the entire device may be connected at the tractor hitch and power lift in a few minutes, and the machine used for transplanting the young plants, supplying water and fertilizer to insure quick growth, with greater production in addition to opening the land by means of a furrow or trench as described, leveling the same, and opening a hole for the plants and water, after which the soil is packed around the plants in one operation. Upon removal of the water tanks and fertilizer hopper or drum, the crops may be treated in killing destructive bud or cut worms, treating with poisoning, cultivating, priming and picking or harvesting the crops. In this way, large acreages may be effectively taken care of in much less time than heretofore, and without tiring a person during the transplanting or picking. The services of only three people are required, as compared to a large number by old methods and in addition, better crops are insured.

While in the foregoing there has been shown and described the preferred embodiment of this invention it is to be understood that minor changes in the details of construction, combination and arrangement of parts may be resorted to without departing from the spirit and scope of the invention as claimed.

What I claim as new is:

1. In a transplanter, a unitary furrow opening and closing assembly comprising a furrow opening shoe having a bifurcated rear end defining rearwardly extending furcations, a combined furrow closing and soil packing means comprising a substantially U-shaped bail member having rearwardly extending legs connected by a generally horizontal bight portion, rollers carried at the free ends of the legs, a plate spaced to one side of one of the furcations, said plate having its forward portion inturned and secured to the shoe, said furcations and plate having aligned openings, the bight portion of the bail member being journaled in said openings, said bight portion having a crank formed therein between said one furcation and the plate, and resilient means disposed between said one furcation and the plate and between the forward inturned portion of the plate and the crank for urging downward swinging movement of the legs and the rollers carried thereby.

2. In a transplanter, a unitary furrow opening and closing assembly comprising a shoe having a bifurcated rear end defining rearwardly extending furcations, plates spaced on opposite sides of the furcations and having their forward ends secured to the shoe, a substantially U-shaped bail member having rearwardly extending legs connected by a generally horizontal bight portion, furrow closing means carried by the free ends of the legs, said furcations and plates having aligned openings, said bight portion being journaled in said openings, said bight portion having a U-shaped crank formed therein that is disposed between one of the furcations and one of the plates, and means disposed solely between said one furcation and said one plate and between said one plate and said crank for yieldingly urging downward swinging movement of the legs and the furrow closing means carried thereby.

LAWTON L. BARNETT.

REFERENCES CITED

The following references are of record in the file of this patent:

UNITED STATES PATENTS

| Number | Name | Date |
| --- | --- | --- |
| 467,428 | Nagley | Jan. 19, 1892 |
| 519,460 | Stevens et al. | May 8, 1894 |
| 1,007,256 | Vivion | Oct. 31, 1911 |
| 1,014,655 | LaRose | Jan. 16, 1912 |
| 1,083,923 | Dillow | Jan. 13, 1914 |
| 1,171,263 | Seymour | Feb. 8, 1916 |
| 1,252,658 | Butler | Jan. 8, 1918 |
| 1,486,512 | Boon | Mar. 11, 1924 |
| 1,504,140 | Poll | Aug. 5, 1924 |
| 1,523,348 | Pegrim | Jan. 13, 1925 |
| 1,698,125 | Donada | Jan. 8, 1929 |
| 1,807,474 | England | May 26, 1931 |
| 1,838,535 | Dattisman | Dec. 29, 1931 |
| 1,886,457 | Winkley | Nov. 8, 1932 |
| 1,918,172 | Barron et al. | July 11, 1933 |
| 2,121,290 | Guion | June 21, 1938 |
| 2,163,802 | Oakley | June 27, 1939 |
| 2,334,598 | Bateman et al. | Nov. 16, 1943 |
| 2,336,152 | Rude | Dec. 7, 1943 |
| 2,347,091 | Elliott | Apr. 18, 1944 |
| 2,366,389 | Deavenport | Jan. 2, 1945 |
| 2,475,078 | Cherry | July 5, 1949 |

FOREIGN PATENTS

| Number | Country | Date |
| --- | --- | --- |
| 127,968 | Switzerland | Dec. 1, 1928 |